Figure 1:
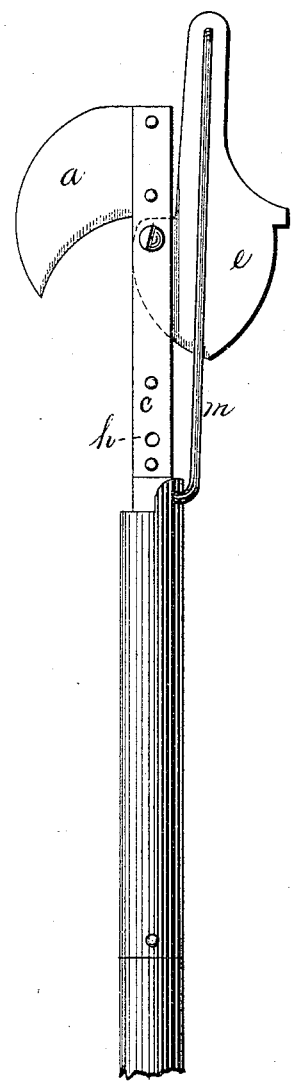

(Model.)

E. F. BAILEY.
PRUNING IMPLEMENT.

No. 250,481. Patented Dec. 6, 1881.

Witnesses,
Franck L. Ouraud
Chas. Williamson

Inventor.
Ebenezer F. Bailey
by W. H. Doolittle
Attorney

UNITED STATES PATENT OFFICE.

EBENEZER F. BAILEY, OF FITCHBURG, MASSACHUSETTS.

PRUNING IMPLEMENT.

SPECIFICATION forming part of Letters Patent No. 250,481, dated December 6, 1881.

Application filed October 20, 1881. (Model.)

*To all whom it may concern:*

Be it known that I, EBENEZER F. BAILEY, a citizen of the United States, residing at Fitchburg, in the county of Worcester and State of Massachusetts, have invented certain new and useful Improvements in Pruning Implements; and I do hereby declare the following to be a full, clear, and exact description of the invention, such as will enable others skilled in the art to which it appertains to make and use the same.

The object of my invention is to provide that class of pruning implements which are operated by pulling the handle, with an attachment which will offer increased resistance to the pull, to better enable the cutting of such twigs and branches as resist insufficiently the pulling action of the implement, and thus ordinarily require the use of an additional or other form of implement to support the limb in order to complete the cutting without tearing or breaking the limb.

This attachment consists of a detachable and adjustable arm, which I have shown in the drawings as applied, for the sake of convenience, to the pruning implement patented to C. Cole and F. L. French, December 2, 1879, No. 222,244.

Figure 2:
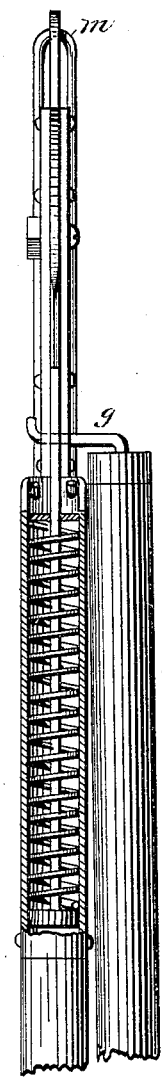
Figure 3:
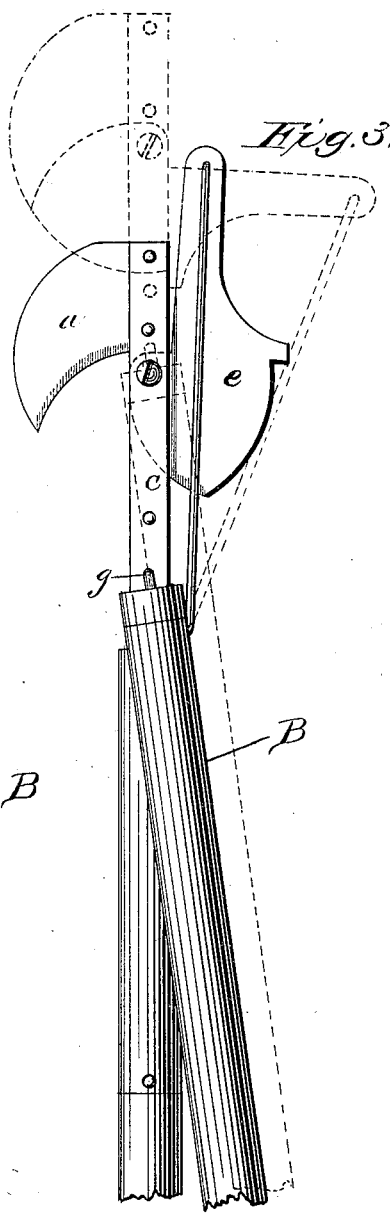

Figure 1 represents a side view of said patented implement, to which a hole, $h$, is added for attachment of my improvement; Fig. 2, a similar view of the same with my improvement attached; and Fig. 3 an additional view of the implement with my attachment, and the operation indicated by dotted lines.

It is sufficient to say here that in the said patent to Cole and French an implement is described having an upper concave or hooked blade, $a$, bolted firmly to the upper end of a spring-arm fixed in the handle, and a lower blade, $e$, pivoted to the spring-arm and moved (when the handle is pulled upon) through a slot beneath the upper blade to meet the latter, by the action of a double rod, $m$, passing through the upper shank of the lower blade and attached at its lower ends to the handle.

B represents the adjustable arm which constitutes my attachment, and which is provided at its upper end with a hook or curved arm, $g$. This hook is to be inserted through a hole, $h$, formed in the spring-arm $c$ below the point where the lower movable blade enters its slot, as shown in Fig. 2. The arm B may be shorter or longer than the handle, or of the same length, as convenience may determine, and may be used on any side of the pruner, as desired. In place of the hole $h$ in the neck of the spring-arm, a ring might be used, and other variations may be made in the clamping mechanism without a substantial departure from my invention.

In operation the attachment is most efficient in keeping the hooked knife in its position when placed over the object to be severed, in providing the knives and head of the pruner sufficient support, and in relieving the strain upon the knives and spring-arm when the handle is pulled, so that the blades are brought together with a quick strong stroke, making a smooth clean cut, and without strain to any of the parts of the implement, and without breaking or tearing the object to be severed. By it certain useful movements and operations are had which are not attainable by arms or handles permanently attached to a pruning implement at other points, or which are limited in their direction of motion. For instance, the arm constituting my attachment can be moved upward while the handle is held still, thus closing the blades upon the object; again, a compound movement may be produced, the arm being pushed up while the handle is pulled down, and by this opposite movement the work of the two parts is divided, the force increased, and a quicker, cleaner cut obtained.

A pruner with this attachment may be used with equal advantage in cutting vines, shoots, twigs, or larger limbs, and in heading trees or trimming hedges.

The use of this attachment is by no means confined to the form of patented pruner above described; but, as above stated, may be used in connection with any implement which operates by a pulling action.

Having thus described my invention, what I claim, and desire to secure by Letters Patent, is—

A pruning implement of the class operated by a pulling action upon the handle, provided with a detachable adjustable arm, $g$, inserted in hole $h$, substantially as described, and for the purposes set forth.

In testimony whereof I affix my signature in presence of two witnesses.

EBENEZER F. BAILEY.

Witnesses:
FREDERICK M. GORDON,
HARRISON BAILEY.